US006469660B1

(12) United States Patent
Horvath et al.

(10) Patent No.: US 6,469,660 B1
(45) Date of Patent: Oct. 22, 2002

(54) METHOD AND SYSTEM FOR DISPLAYING TARGET ICONS CORRELATED TO TARGET DATA INTEGRITY

(76) Inventors: Steve Horvath, 1694 37th Ave. NW., Salem, OR (US) 97304; Robert M. Grove, 1612 N. Main, Newberg, OR (US) 97132; John T. Pratt, 4572 Century Dr. South, Salem, OR (US) 97302

(*) Notice: Subject to any disclaimer, the term of this patent is extended or adjusted under 35 U.S.C. 154(b) by 0 days.

(21) Appl. No.: 09/835,091

(22) Filed: Apr. 13, 2001

Related U.S. Application Data

(60) Provisional application No. 60/243,193, filed on Oct. 25, 2000, provisional application No. 60/217,231, filed on Jul. 10, 2000, and provisional application No. 60/197,160, filed on Apr. 13, 2000.

(51) Int. Cl.[7] .............................. G01S 13/00; G08G 5/04
(52) U.S. Cl. ....................... 342/179; 342/182; 342/183; 340/961
(58) Field of Search ................................. 342/179, 182, 342/183; 340/971–979, 961; 345/581, 589, 837, 977

(56) References Cited

U.S. PATENT DOCUMENTS

| 3,887,916 A | | 6/1975 | Goyer |
|---|---|---|---|
| 4,063,073 A | | 12/1977 | Strayer |
| 4,196,474 A | | 4/1980 | Buchanan et al. |
| 4,623,966 A | * | 11/1986 | O'Sullivan ............... 364/461 |
| 4,639,730 A | | 1/1987 | Paterson et al. |
| 4,646,244 A | | 2/1987 | Bateman et al. |
| 4,746,924 A | | 5/1988 | Lightfoot |
| 4,782,450 A | | 11/1988 | Flax |
| 4,789,865 A | | 12/1988 | Litchford |
| 4,835,537 A | | 5/1989 | Manion |
| 4,839,658 A | | 6/1989 | Kathol et al. |
| 4,853,700 A | | 8/1989 | Funatsu et al. |
| 4,891,650 A | | 1/1990 | Sheffer |
| 4,896,154 A | | 1/1990 | Factor et al. |

(List continued on next page.)

FOREIGN PATENT DOCUMENTS

| EP | 0 405 430 A2 | 1/1991 |
|---|---|---|
| EP | 0 441 309 A1 | 2/1991 |
| EP | 0 493 822 A1 | 7/1992 |

OTHER PUBLICATIONS

Terence S. Abbott, Gene C. Moen, Lee H. Person, Jr., Gerald L. Keyser, Jr., Kenneth R. Yenni, and John F. Garren, Jr., "Flight Investigation of Cockpit–Displayed Traffic Information Utilizing Coded Symbology in an Advanced Operational Environment;" Jul., 1980, pp. 1–28, NTIS; Springfield, Virginia.

(List continued on next page.)

*Primary Examiner*—Thomas H. Tarcza
*Assistant Examiner*—Brian K Andrea
(74) *Attorney, Agent, or Firm*—Alston & Bird LLP

(57) ABSTRACT

A method is provided for determining the integrity of incoming target data and for assigning and displaying a target icon correlated to the target data integrity. Target data integrity depends on the both accuracy and the timeliness of the position data being broadcast about the target. Target data integrity is monitored continuously to display a target icon correlated to the current integrity level. Changes in the target icon alert the flight crew or other user to changes in target data integrity. The icon attributes used to communicate a change in integrity do not interfere with other icon attributes used to communicate other characteristics of a target.

21 Claims, 4 Drawing Sheets

U.S. PATENT DOCUMENTS

| | | |
|---|---|---|
| 4,914,733 A | 4/1990 | Gralnick |
| 4,951,056 A | 8/1990 | Cope et al. |
| 4,980,683 A | 12/1990 | O'Sullivan et al. |
| 5,025,382 A | 6/1991 | Artz |
| 5,077,673 A | 12/1991 | Brodegard et al. |
| 5,111,400 A | 5/1992 | Yoder |
| 5,153,836 A | 10/1992 | Fraughton et al. |
| 5,157,615 A | 10/1992 | Brodegard et al. |
| 5,179,377 A | 1/1993 | Hancock |
| 5,185,606 A | 2/1993 | Verbaarschot et al. |
| 5,200,902 A | 4/1993 | Pilley |
| 5,202,690 A | 4/1993 | Frederick |
| 5,208,591 A | 5/1993 | Ybarra et al. |
| 5,227,786 A | 7/1993 | Hancock |
| 5,265,024 A | 11/1993 | Crabill et al. |
| 5,285,380 A | 2/1994 | Payton et al. |
| 5,355,442 A | 10/1994 | Paglieroni et al. |
| 5,381,140 A | 1/1995 | Kuroda et al. |
| 5,420,968 A | 5/1995 | Johri |
| 5,442,556 A | 8/1995 | Boyes et al. |
| 5,446,465 A | 8/1995 | Diefes et al. |
| 5,450,329 A | 9/1995 | Tanner |
| 5,493,309 A | 2/1996 | Bjornholt |
| 5,519,392 A | 5/1996 | Oder et al. |
| 5,548,515 A | 8/1996 | Pilley et al. |
| 5,570,095 A | 10/1996 | Drouilhet, Jr. et al. |
| 5,574,648 A | 11/1996 | Pilley |
| 5,596,332 A * | 1/1997 | Coles et al. ................ 342/455 |
| 5,604,504 A | 2/1997 | Nail |
| 5,636,123 A | 6/1997 | Rich et al. |
| 5,638,282 A | 6/1997 | Chazelle et al. |
| 5,677,841 A | 10/1997 | Shiomi et al. |
| 5,745,073 A * | 4/1998 | Tomita ....................... 342/179 |
| 5,760,737 A | 6/1998 | Brenner |
| 5,781,146 A | 7/1998 | Frederick |
| 5,838,262 A | 11/1998 | Kershner et al. |
| 5,839,080 A | 11/1998 | Muller et al. |
| 5,867,804 A | 2/1999 | Pilley et al. |
| 5,872,526 A | 2/1999 | Tognazzini |
| 5,883,586 A | 3/1999 | Tran et al. |
| 5,884,223 A | 3/1999 | Tognazzini |
| 5,892,462 A | 4/1999 | Tran |
| 5,910,788 A | 6/1999 | Class |
| 5,920,276 A | 7/1999 | Frederick |
| 5,923,286 A | 7/1999 | Divakaruni |
| 5,926,132 A | 7/1999 | Brenner |
| 5,936,552 A | 8/1999 | Wichgers et al. |
| 5,945,926 A | 8/1999 | Ammar et al. |
| 5,969,668 A | 10/1999 | Young, Jr. |
| 5,969,672 A | 10/1999 | Brenner |
| 5,978,715 A | 11/1999 | Briffe et al. |
| 5,995,038 A | 11/1999 | Ikizyan |
| 5,999,116 A | 12/1999 | Evers |
| 6,021,374 A | 2/2000 | Wood |
| 6,064,335 A | 5/2000 | Eschenbach |
| 6,094,169 A | 7/2000 | Smith et al. |
| 6,154,151 A | 11/2000 | McElreath et al. |
| 6,211,811 B1 * | 4/2001 | Evers ......................... 342/36 |
| 6,271,768 B1 * | 8/2001 | Frazier, Jr. et al. ......... 340/961 |
| 6,384,783 B1 | 5/2002 | Smith et al. |
| 2002/0021247 A1 | 2/2002 | Smith et al. |

OTHER PUBLICATIONS

Sandra G. Hart and Les L. Loomis, "Evaluation of the Potential Format and Content of a Cockpit Display or Traffic Information," *Human Factors*, Oct., 1980; pp. 591–604; 22(5); The Human Factors Society, Inc.

Paul R. Drouilhet, Jr., "Air Traffic Control Development at Lincoln Laboratory," *The Lincoln Laboratory Journal*, 1989; pp. 331–344; vol. 2, No. 3 (U.S.).

J.L. Gertz, "Multi–sensor Surveillance for Improved Aircraft Tracking," *The Lincoln Laboratory Journal*, 1989; pp. 381–396; vol. 2, No. 3 (U.S.).

W.H. Harman, "TCAS: A System for Preventing Midair Collisions," *The Lincoln Laboratory Journal*, 1989; pp. 437–458; vol. 2, No. 3 (U.S.).

Akira Miura, Hiroyuki Morikawa, Moriyuki Mizumachi, "Air Traffic Control Data Tables for Conflict Alert Systems;" *Electronics and Communications in Japan, Part 1*; 1996, pp. 101–113; vol. 79, No. 6; translated from *Denshi Joho Tsushin Gakkai Ronbunshi*; vol. 78–B–II, Apr. 1995; pp. 240–249; 1996 Scripta Technica, Inc.; ISSN 8756–6621/ 0006–0101; XP 0005 88958.

* cited by examiner

ADS-B Airborne Position Signal 83

| Type Code 84 | Altitude 86 | Time of Applicability 85 | Latitude 81 | Longitude 82 |
|---|---|---|---|---|

NUCp
80

METHOD AND SYSTEM FOR DISPLAYING TARGET ICONS CORRELATED TO TARGET DATA INTEGRITY

RELATED APPLICATIONS

This application claims the benefit and priority of pending Provisional Application Serial No. 60/243,193, filed Oct. 25, 2000, pending Provisional Application Serial No. 60/217,231, filed Jul. 10, 2000, and pending Provisional Application Serial No. 60/197,160, filed Apr. 13, 2000, each of which is incorporated herein by reference.

TECHNICAL FIELD

The present invention relates generally to the field of air traffic display systems. More particularly, the invention includes a method and system for depicting an aircraft or a ground vehicle on a display using a target icon which is correlated to the integrity of the incoming data describing the vehicle's position and track.

BACKGROUND OF THE INVENTION

Since the dawn of aviation, pilots and aircraft designers alike have continually sought new and better ways to augment and enrich the pilot's own sensory perception with a variety of on-board and ground-based equipment. For safe flight, pilots need information about the flight path and the environment in which his or her own ship is flying. Flight path data includes position, track, speed, and other navigational data, as well as a variety of information from the pilot's ownship, as it is called. Environmental data includes information about the weather, the terrain, and the position and track of other aircraft in the vicinity.

The purpose of ownship equipment is to provide an aid to visual acquisition, conflict detection, threat assessment, and conflict avoidance. Advances in aviation technology have vastly increased the amount of information that can be provided to pilots. Multi-function cockpit displays such as a Cockpit Display of Traffic Information (CDTI) may depict a wide variety of data, such as air traffic, ground traffic, weather, and terrain, at different times and in different combinations, using a single screen.

The CDTI is a means of presenting surveillance information about the surrounding traffic to the flight crew. Traffic includes aircraft as well as ground vehicles or fixed obstructions. The information presented includes the relative position of a target of interest. The term "target" refers to traffic that is nearby the ownship and may be of interest to the flight crew and other CDTI users. Target data for the CDTI may be obtained from a variety of sources, including Automatic Dependent Surveillance—Broadcast (ADS-B). Targets typically are represented by displaying a selected icon on the CDTI.

One challenge presented by the wide variety of data available for display on a CDTI is the fact that different data may possess different levels of integrity. In this context, integrity is related to the probability that the true location of an aircraft is outside a certain volume of space defined by a containment boundary that surrounds the three-dimensional position being broadcast. A first aircraft, for example, may be broadcasting its three-dimensional position with high integrity, whereas the data being broadcast by a second aircraft may have much lower integrity. Displaying both aircraft with the same icon may create the false impression that the data supporting the position has equal integrity.

High-integrity air traffic data is desired for safe flight, especially given the increase in air traffic worldwide. The integrity of the data about a particular target depends on several factors, including the timeliness of the latest data transmission and the accuracy of the position data within the signal transmitted.

Different applications that make use of the traffic data on a CDTI require different levels of data integrity. Target data may be used and processed in a variety of applications including, for example, a Conflict Situational Awareness (CSA) application and a Range Monitoring (RM) application. Some applications require and use only traffic data having a sufficiently high integrity.

Target data integrity may also vary over time, depending on the characteristics of a particular transmission. Data signal quality can improve or degrade due to satellite positions, sensor positioning, or sporadic signal reception. In some instances, the integrity of the ownship's position data may degrade, thereby affecting the ability of onboard applications to accurately monitor the traffic situation.

Thus, there is a need to raise the awareness of pilots and other users of air traffic monitoring data to the integrity of the data supporting a target being displayed. There is a related need to raise the awareness of pilots to changes in data integrity.

There is also a need for differentiating between high-integrity and lower-integrity target data to indicate which targets are suitable for use by a particular application.

There is still further a need for updating the traffic icon if and when the target data's integrity changes.

SUMMARY OF THE INVENTION

The above and other needs are met by the present invention which, in one embodiment, provides a method for determining the integrity of incoming target data and provides a system for assigning and displaying a target icon that is correlated to reflect the target data's integrity. In a preferred embodiment, the invention provides a set of target icons which are correlated to target data integrity. Such a set of icons should be capable of varying in color, size, shape, and/or other characteristics such as being outlined or filled, or flashing or still, to reflect the target data's integrity.

It should be understood that integrity includes both an accuracy aspect and a timeliness aspect. Data from a target will not be assigned a high integrity unless it is both accurate and recent. Accurate position data must be recent to be reliable. Likewise, recent position data must also be accurate to be reliable. In one aspect of the invention, the system compares the current time to the time of measurement of the incoming position data.

Integrity is related to the probability that the true position of an aircraft is outside an imaginary volume of space (defined by a containment boundary) which surrounds the three-dimensional position being broadcast. If the probability that the true position is outside the containment boundary is high, then the data accuracy is low and, therefore, the integrity of the position data is low. Conversely, if the probability that the true position is outside the containment boundary is low, then the data accuracy is high and, accordingly, the integrity of the position data is high.

Components of the System

According to another aspect, the system of the present invention comprises a computer or other automated system for processing and implementing the rules described herein in order to display accurate and timely data on a cockpit display. In one preferred embodiment, the system itself is housed within a Link and Display Processor Unit (LDPU) which serves as the data link between the signals received and the icons displayed.

In one preferred embodiment, the system of the present invention is in communication with a plurality of signal receivers, an LDPU, and a Cockpit Display of Traffic Information (CDTI). Each signal receiver is configured to receive a particular type of signal and communicate the data received to the LDPU. One or more signal receivers may be housed within the LDPU itself. Through the signal receivers, position data is received about a plurality of targets.

The system of the present invention is capable of processing ADS-B signals broadcast by targets of interest and is also capable of interpreting other types of signals. An ADS-B (Automatic Dependent Surveillance—Broadcast) signal includes a variety of indicators, typically including a Type Code, a time of applicability, a pressure altitude, a latitude, and a longitude.

The Type Code indicates the type of message being broadcast and serves as an accuracy indicator of the data to follow. The Type Code may be used to determine a value for the Navigational Uncertainty Category for Position (NUCp). The NUCp value indicates a level of accuracy of the latitude and longitude coordinates included in the ADS-B position message. For a target broadcasting a transponder signal instead of an ADS-B signal, a Type Code may be calculated and then used to determine the NUCp value.

The time of applicability embedded within the ADS-B signal represents the time when the position measurement was made.

Integrity Monitoring

One aspect of the present invention includes a set of rules for determining the integrity of the data being received about a target. A target in this context is defined as traffic that is nearby the ownship and may be of interest to the user. Applying the rules to a set of measurable criteria determines whether the integrity of the target data is high or low. High-integrity targets are depicted on the cockpit display using a certain icon, while low-integrity targets are depicted using a different icon. In one embodiment, high-integrity targets are depicted using a pointed chevron, while low-integrity targets are depicted using a rounded bullet.

In another aspect of the present invention, applying the rules to determine integrity continues in time, displaying changes in the icon displayed which are intended to communicate changes in signal integrity. In other words, the data integrity is continually monitored for changes in order to provide current information to the user in the form of specific icons reflecting any change in data integrity. Changing the target icon alerts the flight crew to changes in data integrity. Changing the target icon also alerts the flight crew to the fact that a target may no longer be of sufficient integrity to be monitored by the conflict detection applications.

Target Status Transitions

In one aspect of the present invention, each target is assigned a status. Target status is continually updated to reflect changes in status known as transition events. Target status is changed in response to a transition event if and when certain logic and timing constraints are satisfied. When target status changes, the system of the present invention changes the target icon used to display the target.

Target status begins with the "Acquire" state when the target data is first received, and ends with the "Drop" state when the target data is lost. A variety of transition events may occur while a target is being monitored. In one aspect of the present invention, a specific target icon is used to represent each specific transition event in order to alert the user to changes in target status.

The target icons of the present invention are designed to convey the current target status and whether the target has undergone a transition event. In an important aspect of the present invention, each target icon also conveys the target's position data integrity. A transition event associated with, or caused by, a change in position data integrity is of particular importance to pilots and other users of air traffic monitoring applications.

Target Acquired

In one aspect of the present invention, when one of the signal receivers receives data from a new source, the system of the present invention assigns a target status of "Acquire" to identify the new target. The inventive system immediately analyzes the integrity of the data embedded within the new target signal, using certain logic and timing constraints, in order to assign the appropriate target icon.

Generally, if the target data integrity is high and the ownship's data integrity is high, then the new high-integrity target is depicted using a pointed chevron icon. If, however, the target data integrity is low or the ownship's data integrity is low, then the new low-integrity target is depicted using a rounded bullet icon. Airborne targets are cyan in color, while ground targets are tan in color.

More specifically, the integrity of the target's position is determined by analyzing the data within the signal. The Type Code within an ADS-B signal is a first indicator of the accuracy of the data. In one aspect of the present invention, the Type Code is mapped to a particular value for the Navigational Uncertainty Category for Position (NUCp). The NUCp value indicates a level of integrity of the latitude and longitude coordinates included in the ADS-B position message. The NUCp value is defined as the radius of a circle in the horizontal plane (specifically, in the local plane tangent to the WGS-84 ellipsoid), with its center being at the true position of the target, which describes the region which is assured to contain the indicated horizontal position. The probability that the indicated position lies outside this circle is 1 times $10^{-7}$ per flight hour. Because integrity is also affected by the timeliness of the data, the time of applicability embedded within the ADS-B signal is also used to determine data integrity.

In one preferred aspect of the invention, the integrity may be determined to be high if and when the following logic and timing constraints are satisfied: (1) the NUCp value indicates a horizontal containment radius of one nautical mile or less; (2) the ADS-B message includes valid position and velocity information; and, (3) the time of applicability, when compared to the current time, indicates that the most recent ADS-B message was received within the last five seconds. Targets not meeting these requirements are designated as having a lower level of integrity.

It should be understood that the values associated with the integrity analysis, such as the horizontal containment limit of one nautical mile and the time limit of five seconds, may in a preferred embodiment be adjusted by the user or by the system, depending upon the monitoring application to be executed against the target. For example, a Range Monitoring (RM) application may require a time limit of three seconds in order to accurately monitor a target of interest. The system of the present invention is preferably capable of adjusting the time limit to accommodate the needs of various applications.

Ownship Status

In another aspect of the present invention, the user's ownship position data integrity is also continuously monitored. Accurate ownship data is important to safe flight because it is compared to target data when determining whether a potential conflict between aircraft exists. Thus, if the ownship position data has a low level of integrity (poor quality and/or poor timeliness), then the targets are displayed with target icons representing a lower level of integrity. In one embodiment, the ownship is displayed using a white triangle icon. The color white is also typically used to display the ownship's track, distance range markings, and airport reference identification codes.

Moreover, as described above, the determination of target data integrity also depends upon ownship data integrity. Ownship data integrity is important in the operating environment of the inventive system because an overall air traffic monitoring system may include conflict detection applications that compare target data to ownship data. In applications such as Conflict Situational Awareness (CSA) and Range Monitoring (RM), the results of the internal conflict detection algorithms are not sufficiently reliable unless the target data has high integrity and the ownship data has high integrity.

In a related aspect of the system of the present invention, the target icon may change in response to a change in ownship data integrity. Displaying target icons that also reflect ownship data integrity is an important tool for pilots and other users because, in practice, they are relying on the accuracy of the conflict detection algorithms for safe flight.

It should be understood, however, that the present invention may be utilized not only where the ownship is an aircraft aloft or on the ground, but also where the ownship is a ground vehicle, a stationary monitoring station, or another fixed location. Of course, the data describing a fixed ownship location would typically have a high integrity.

Improve/Degrade

In another aspect of the present invention, the system continuously monitors target data integrity and target status. An important transition event affecting data integrity is the loss or degradation of an incoming target signal. In one embodiment of the inventive system, the target icon changes if and when target data integrity degrades for a period of five seconds (or when ownship data integrity degrades for a period of five seconds). For example, in one preferred embodiment, an airborne high-integrity target displayed by a cyan chevron would change to a cyan bullet icon in response to a data integrity degrade.

In another aspect of the invention, a change of target icon may be accompanied by an audible alert message. For example, when target integrity degrades, an audible alert such as "Target Degrade" may be sounded to alert the user (in addition to and associated with the change in the shape of the target icon from a chevron to a bullet). Similarly, in a related aspect of the invention, a change of target icon may also be accompanied by a text message on the screen. For example, when target integrity degrades, a text message such as "Target Degrade" or "TGT Degrade" may be displayed to alert the user.

Likewise, the re-acquisition or improvement of a target signal is sensed by the inventive system. In one embodiment of the inventive system, the target icon changes if target data integrity improves and has not degraded for a period of three seconds; provided, however, that ownship data integrity has either improved or has not degraded for a period of three seconds and no conflict alert condition has existed for more than two seconds.

Other Changes in Target Icon

It should be understood that the inventive system of changing the target icon in response to changes in data integrity may be used in an overall system of air traffic monitoring and conflict detection that necessarily involves changes in target icons that are unrelated to data integrity. For example, the pilot in certain monitoring systems may select or de-select a particular target on the display to learn more about its status. In one system, for example, the target icon color is changed to green and the target icon shape becomes filled when the target has been "selected" by the user. While the target icon may change in response to being selected or de-selected, this change does not reflect a change in data integrity.

Also, the starting and stopping of certain conflict detection applications such as CSA and RM, in certain systems, may also involved a change in the target icon displayed. In one such system, for example, the target icon color is changed to yellow and the target icon flashes while a conflict detection application is being applied against a target.

Furthermore, changes in target icon may occur in certain systems when a conflict detection application is being applied against a target that has also been "selected" by the user. In one such system, for example, the target icon color is changed to yellow, the target icon shape becomes filled, and the target icon flashes while a conflict detection application is being applied against a "selected" target.

Finally, it should be understood that the target icon is typically removed from the display when a target signal is lost for a period of time.

In an important aspect of the present invention, the system of changing target icons in correlation with changes in data integrity is further designed to work in concert with other traffic monitoring systems without creating confusion or delivering misleading information about data integrity. The target icon attributes in a preferred embodiment of the invention consist of shapes, sizes, colors, and/or other icon conditions that complement the standardized target icon attributes already in use to depict targets of interest.

Ground Targets

According to another aspect of the present invention, for targets on the ground, surface vehicles may be shown using a tan square icon. Aircraft on the ground may be shown using a tan chevron, markedly smaller than the chevron used for airborne aircraft. When the position data from a ground target is not valid, then the target may be displayed using a tan circle icon. Stationary ground targets such as tethered pole towers may be shown using a tan caret icon.

Adjustable Criteria

According to another aspect of the present invention, the criteria used to determine the integrity of incoming target data may be adjusted either manually by the user or automatically by a different air traffic monitoring application. In one preferred embodiment, the upper and lower limits applied to any element within the incoming signal, such as the Type Code or the horizontal containment limit or the time limit, may be adjusted to accommodate the needs of the particular application.

Thus, embodiments of the present invention provide a method for determining the integrity of incoming target data and a system for assigning and displaying a target icon correlated to the target data integrity. Embodiments of the present invention further provide a method for adjusting the criteria against which incoming target data is measured for integrity. Embodiments of the present invention further provide a method and system for determining when a target signal undergoes a transition of sufficient magnitude to warrant a change in the cockpit display. Embodiments of the present invention provide a method and system for changing the target icon when and if the target data integrity changes. Thus, embodiments of the present invention provide distinct advantages in displaying correlated target icons on a cockpit display.

DETAILED DESCRIPTION OF THE PREFERRED EMBODIMENT

Figure 1:
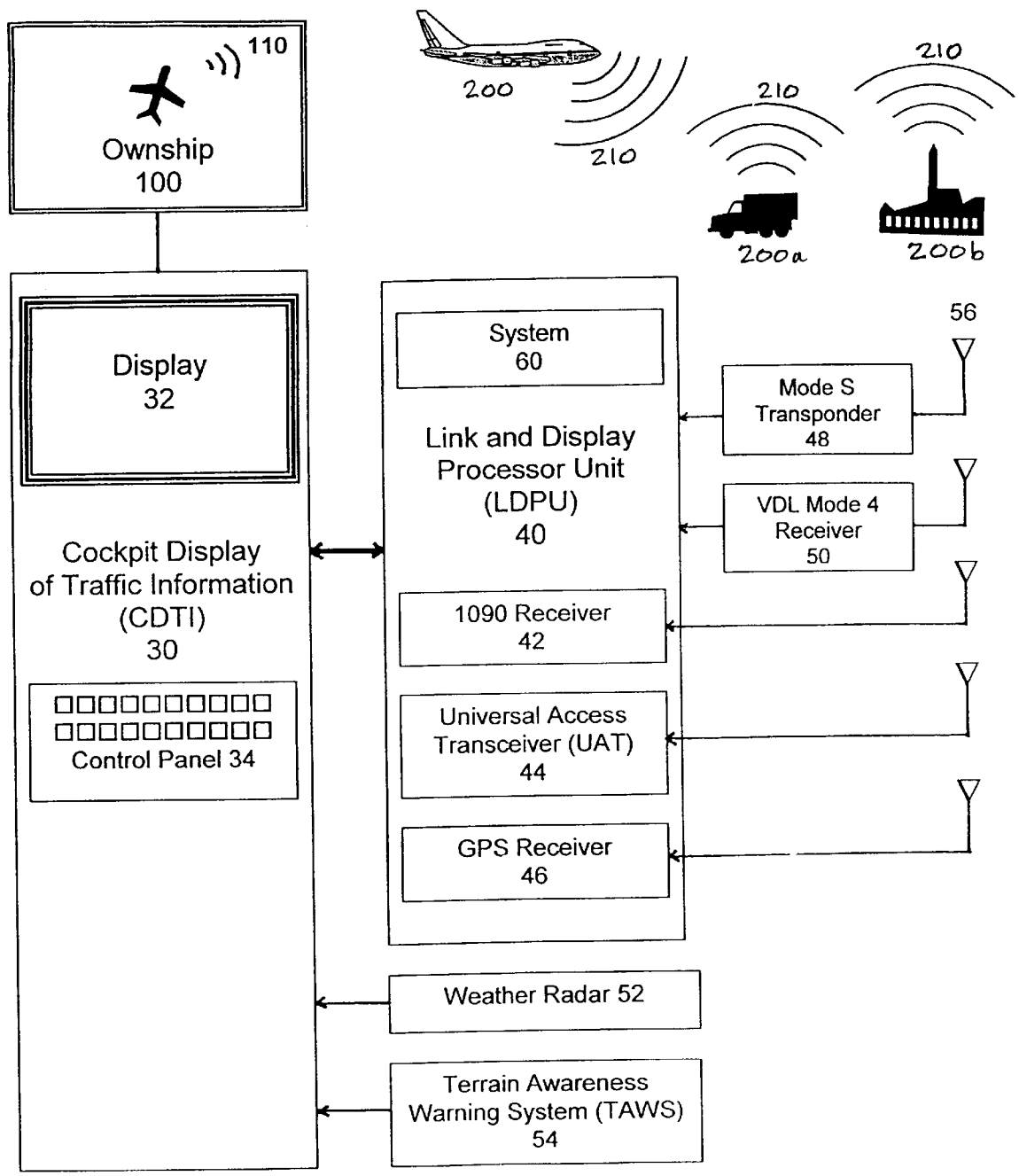
FIG. 1 is a diagrammatic illustration of the components of one embodiment of a traffic monitoring and display system, including a Cockpit Display of Traffic Information (CDTI) 30 which receives and exchanges information with a Link and Display Processor Unit (LDPU) 40.

Reference will now be made to the drawings, in which like numerals indicate like elements throughout the several views.

The Multi-Function Cockpit Display

FIG. 1I is a diagrammatic illustration of the components of a typical traffic monitoring and display system. The ownship 100 may be an aircraft aloft or on the ground, a ground vehicle, or a stationary monitoring station. The ownship may broadcast its position data 110. The target 200 may be an aircraft aloft or on the ground, a ground vehicle 200a, or a ground obstruction 200b such as a building or a tethered pole. Target position data 210 may be broadcast from the target 200 or from another source such as ground radar surveillance. For example, the target 200 may broadcast position data 210 in the form of an ADS-B signal, whereas the position data 210 about a target 200 operating in TIS (Traffic Information System) mode may be broadcast using ground radar.

The multi-function cockpit display shown in FIG. 1 is a Cockpit Display of Traffic Information (CDTI) 30 and it is generally capable of depicting a wide variety of data, including air traffic, ground traffic, weather, and terrain, at different times and in different combinations, on a single display 32. The CDTI 30 includes a control panel 34 which acts as an interface with a user. The CDTI 30 receives information from a Link and Display Processor Unit (LDPU) 40, as well as a weather radar signal 52 and a Terrain Awareness Warning System (TAWS) 54. Techniques for showing various visual features on a CDTI are well known to those skilled in the art.

The system 60 of the present invention may be housed in the LDPU 40. In one aspect of the present invention the system 60 comprises a computer or other automated system for processing and implementing the rules described herein for displaying target icons correlated to target data integrity. Preferably, the system 60 is in communication with the CDTI 30 and the LDPU 40 and its components.

In another aspect of the present invention, the system 60 analyzes target data integrity continuously, from a plurality of targets. Incoming target data may be stored in a target file having a series of database records and accessible to the system 60 and organized in a manner known to those skilled in the art. The system 60 may be configured to access both current and older records when assessing whether a change in target data integrity has occurred. The target file accessed by the system 60 may also be configured to store and retrieve other characteristics of interest about a plurality of targets.

The LDPU 40 includes and is linked with a variety of receivers capable of receiving and interpreting a variety of signal types. In one preferred embodiment, the LDPU 40 gathers information using a 1090 Receiver 42, a Universal Access Transceiver (UAT) 44, a Global Positioning Satellite (GPS) Receiver 46, a Mode S Transponder 48, and a VDL Mode 4 Receiver 50. Each of these receivers acquires information using one or more antennae 56.

Target Status, Target Icons, and Target Status Transition Events

Figure 2:
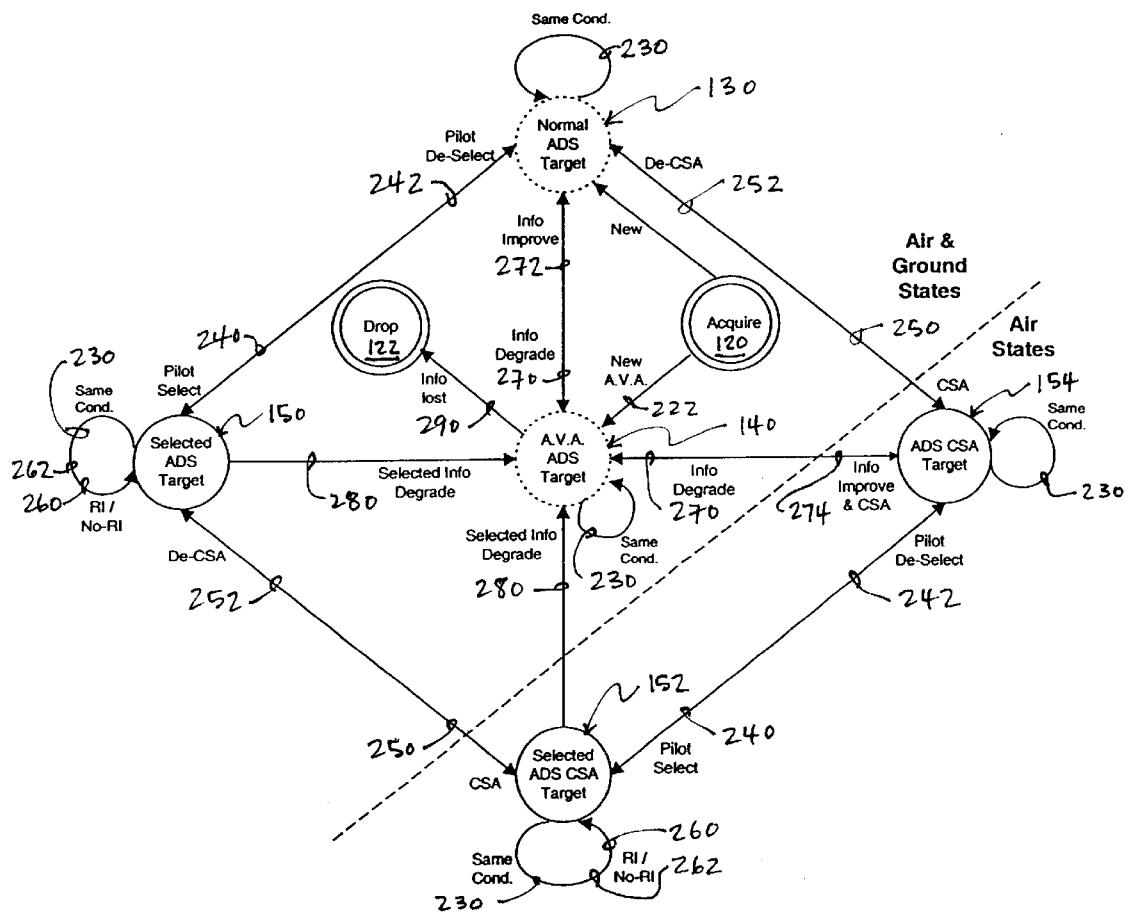
FIG. 2 is an extended state transition diagram showing the various target states and target status transitions. The circles represent the different target states, such as the Acquire state 120. The arrows between the different states represent a transition in target status, such as the Info Improve transition 272.

Referring now to FIG. 2, the following explanation of the target states shown will begin with the double-circled "Acquire" state 120 in the upper right quadrant. When a target 200 is acquired, the target position data 210 is analyzed to determine whether the target data integrity is high or low. Each target 200 is assigned a status, represented by the circles in FIG. 2. Target status is continuously updated to reflect changes in status known as transition events, represented by the arrows between the circles in FIG. 2. Target status is changed in response to a transition event if and when certain logic and timing constraints are satisfied. When target status changes, the system of the present invention changes the target icon used to display the target 200.

Target status is represented by the circles in FIG. 2. The present invention provides a method and system for displaying a specific target icon that corresponds to a particular target status. In a preferred embodiment, as shown in Table 1 below, the following types of target status are correlated to a specific target icon.

TABLE 1

| Target Status | Location on FIG. 2 | Target Icon |
|---|---|---|
| Normal ADS Target 130 | top circle | Solid Cyan Chevron (airborne target) |
| | | Solid Tan Chevron (ground target) |
| A.V.A. ADS Target 140 | center | Solid Cyan Bullet (airborne target) |
| | | Solid Tan Bullet (ground target) |
| Selected ADS Target 150 | left circle | Outlined Cyan Chevron (airborne target) |
| | | Outlined Tan Chevron (ground target) |

TABLE 1-continued

| Target Status | Location on FIG. 2 | Target Icon |
|---|---|---|
| Selected ADS CSA Target 152 | bottom circle | Yellow, Outlined, Flashing Chevron |
| ADS CSA Target 154 | right circle | Yellow Flashing Chevron |

Figure 4B:
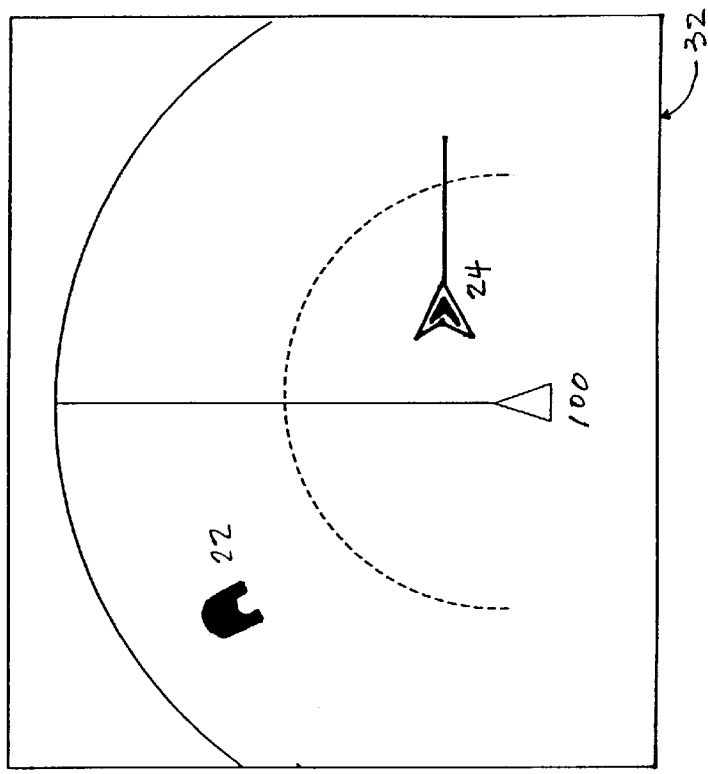
FIG. 4b shows the display 32 of FIG. 4a, at a later time, after a change in target status and a corresponding change in target icon has occurred.
Figure 4A:
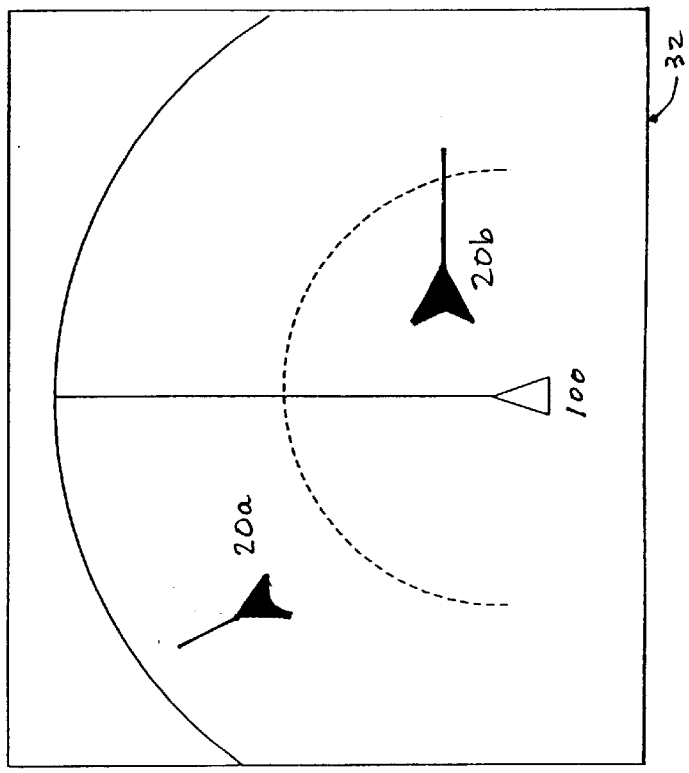
FIG. 4a shows a display 32 of target information including two targets and their positions relative to the ownship 100.
Figure 1:
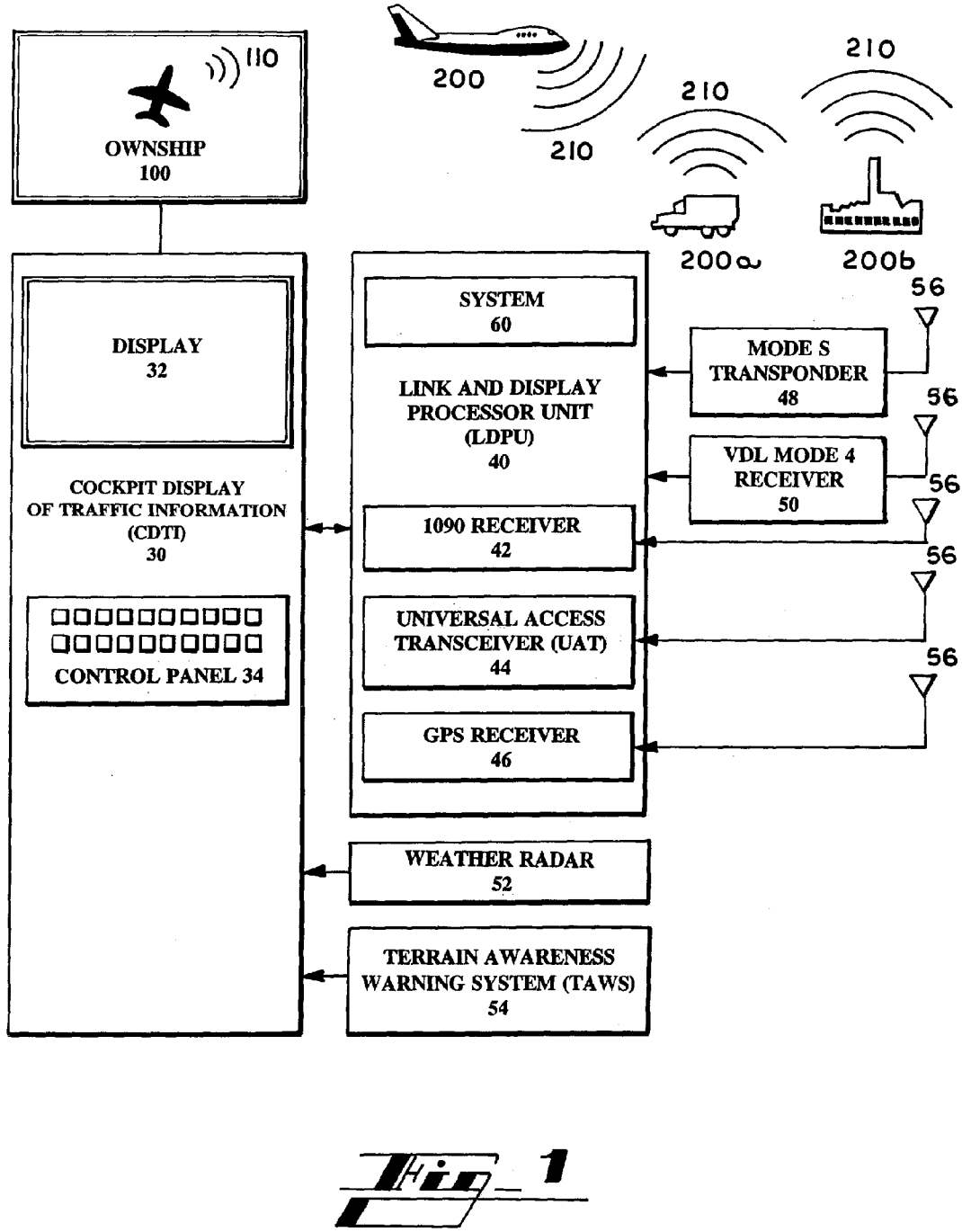

Referring briefly to examples of a few of these target icons, FIG. 4a shows two solid chevron target icons 20a, 20b on a display 32 relative to the ownship 100. FIG. 4b shows the same targets, at a later time, after undergoing a transition into a solid bullet target icon 22 and an outlined chevron 24, respectively. The transitions causing the particular change in target icon are discussed below.

Returning to FIG. 2, the arrows between the different target states represent a transition in target status of sufficient magnitude to warrant a change on the cockpit display 32. The target 200 undergoes a transition if and when: (1) an event associated with a transition in target status occurs; and, (2) the logic and timing constraints associated with the event are satisfied. The present invention changes the target icon in correlation with the particular transition event, as shown in FIG. 2 and in Table 2, below.

The display of airborne target states versus ground target states by the system 60 of the present invention is also depicted in FIG. 2. If either the target 200 or the ownship 100 is on the ground, the target status remains in one of the states shown above the diagonal dashed line in FIG. 2.

The transition arrows labeled "Pilot Select" 240 and "Pilot De-Select" 242 refer to the change in status caused when a pilot or other user optionally "selects" or "de-selects" a high-integrity ADS target 200 in order to display additional information about it. Selected targets are shown in FIG. 2 in the lower and left parts of the quadrant, while de-selected targets are shown in the upper and right parts of the quadrant.

Table 2, below, may be used when referring to FIG. 2. Table 2 lists and describes the actions that occur and affect the status of a target 200, with logic and timing constraints, the corresponding transition event label, and the corresponding change in the display including changes in the target icon. The transition events in the center column may be correlated to the arrows shown in FIG. 2.

TABLE 2

| Row | Actions, with Logic & Timing Constraints | Transition Event (See FIG. 2) | Display Change |
|---|---|---|---|
| 1 | Acquire new target 200. | Enter Acquire state 120. | No action. |
| 2 | 1. Target data integrity is high; AND 2. Ownship data integrity is high. | New Target transition 220 to Normal ADS Target state 130. (High Data Quality) | 1. Add target 200 to target file. 2. Initiate CSA against target 200 if airborne. 3. Display target icon (such as solid chevron 20a in FIG. 4a). |
| 3 | 1. Target data integrity is low; AND 2. Ownship data integrity has been low for at least 5 seconds. | New A.V.A. Target transition 222 to A.V.A. ADS Target state 140. (Low Data Quality) | 1. Add target 200 to target file. 2. Do not initiate CSA against target 200. 3. Display target icon (such as solid bullet 22 in FIG. 4b). |
| 4 | 1. Target data integrity remains the same; AND 2. Ownship data integrity remains the same. | Same Condition 230. | No action. |
| 5 | Pilot selects a target. | Pilot Select transition 240. | Change target icon (for example, from a solid chevron 20b in FIG. 4a to an outlined chevron 24 in FIG. 4b). |
| 6 | Pilot de-selects a selected target. | Pilot De-Select transition 242. | 1. Change target icon. 2. Reset the accumulated range limit period. 3. Turn off RM. |
| 7 | 1. Target 200 airborne; AND 2. Ownship 100 airborne; AND 3. Detect CSA alert condition for 2 seconds. | CSA Alert transition 250. | 1. Sound an audible alert: "Traffic, Traffic." 2. Display a text message (optional). 3. Change target icon. |
| 8 | 1. Target 200 is on the ground; OR 2. Ownship 100 is on the ground; OR 3. Detect no CSA alert condition for 5 seconds. | De-CSA transition 252. | Change target icon. |
| 9 | 1. Target 200 airborne; AND 2. Ownship 100 airborne; AND 3. Detect range limit against the selected target for 3 seconds. | RI Alert transition 260. | 1. Sound an audible alert: "Target Range." 2. Display a text message (optional). |

TABLE 2-continued

| Row | Actions, with Logic & Timing Constraints | Transition Event (See FIG. 2) | Display Change |
|---|---|---|---|
| 10 | 1. Target 200 transitions to the ground; OR<br>2. Ownship 100 on the ground; OR<br>3. Detect no range limit against the selected target for 5 seconds. | No-RI transition 262. | No action. |
| 11 | 1. Target data integrity degrades for 5 seconds; OR<br>2. Ownship data integrity degrades for 5 seconds. | Info Degrade transition 270. | Change target icon (for example, from a solid chevron 20a in FIG. 4a to a solid bullet 22 in FIG. 4b). |
| 12 | 1. Selected target data integrity degrades for 5 seconds; OR<br>2. Ownship data integrity degrades for 5 seconds. | Selected Info Degrade transition 280. | 1. Sound an audible alert: "Target Degrade."<br>2. Display a text message: "TGT Degrade."<br>3. Change target icon. |
| 13 | 1. Target data integrity has not degraded for 3 seconds; AND<br>2. Ownship data integrity has not degraded for 3 seconds; AND<br>3. Detect an alert condition of less than 2 seconds OR detect no alert condition at all. | Info Improve transition 272. | Change target icon (for example, from a solid bullet 22 in FIG. 4b to a solid chevron 20a in FIG. 4a). |
| 14 | 1. Target data integrity has not degraded for 3 seconds; AND<br>2. Ownship data integrity has not degraded for 3 seconds; AND<br>3. Detect alert condition for 2 seconds. | Info Improve & CSA Alert transition 274. | 1. Sound an audible alert: "Traffic, Traffic."<br>2. Change target icon. |
| 15 | Target lost for 5 seconds. | Info Lost transition 290 to Drop state 122. | Delete target 200 from the target file. |

Referring again to FIG. 2, the initial target state for a newly acquired target 200 is the double-circled Acquire state 120 shown in the upper right quadrant. The acquisition of a new target is described in Row 1 of Table 2. In one aspect of the invention, the integrity of the target position data 210 is immediately determined by analyzing data within the incoming signal.

Figure 3:
FIG. 3 is a simplified diagram showing the components of one type of ADS-B airborne position message 83, including the Type Code 84 which is used to determine the NUCp 80.

In one aspect, the system 60 of the present invention is capable of processing target position data 210 to determine target data integrity by interpreting an ADS-B signal 83 or a variety other types of incoming data signals. The NUCp value 80 indicates the level of accuracy of the latitude 81 and longitude 82 included in the target position data 210. If the target position data 210 is an ADS-B signal 83, shown in FIG. 3, then the Type Code 84 embedded within the ADS-B signal 83 is an indicator of the accuracy of the target position data 210. The Type Code 84 corresponds to a particular NUCp value 80. The target position data 210 also includes a time of applicability 85 which indicates precisely when the position measurement was made. The ADS-B signal 83 also typically includes a unique identifier for the target 200.

In one aspect of the invention, the target data integrity is high if: (1) the NUCp 80 indicates a horizontal containment radius of one nautical mile or less; (2) the target position data 210 includes valid position and velocity information; and, (3) the time of applicability 85 indicates that the most recent target position data 210 was received within the last five seconds. Targets 200 not meeting this criteria are designated as having a low target data integrity. In one embodiment, high-integrity targets are depicted using a pointed chevron 20a, 20b as shown in FIG. 4a, while low-integrity targets are depicted using a rounded bullet 22, as shown in FIG. 4b.

In another aspect of the present invention, it should be understood that the rules for determining target data integrity continue in time, displaying changes in the target icon that are intended to communicate changes in the data integrity. In other words, the data integrity is continually monitored for changes in order to provide current information to the user in the form of specific icons reflecting any change in data integrity. Changing the target icon alerts the flight crew to changes in data integrity. Changing the target icon also alerts the flight crew to the fact that a target may no longer be of sufficient integrity to be monitored by the conflict detection applications.

In the preferred embodiment of the invention, the user's ownship data integrity is also continuously monitored. Table 2 describes the use of ownship data integrity in the logic and timing constraints to determine whether a transition event has occurred with respect to a particular target. For applications where the ownship 100 is an aircraft aloft, ownship data integrity is important because the traffic monitoring and conflict alert applications utilize the relative positions between a moving ownship 100 and a target 200. When considering ownship data in the context of all the potential uses of the present invention, however, it should be understood the ownship 100 may be an aircraft aloft, an aircraft on the ground, a ground vehicle, a stationary monitoring station, or another fixed location.

Referring now to Rows 2 and 3 of Table 2, the target data integrity determines which transition event takes place and which target state is achieved. Targets with high target data integrity (Row 2) undergo a New Target transition 220, represented by the "New" arrow in FIG. 2, and are displayed in the "Normal ADS Target" state 130, shown in the circle at the top of FIG. 2. Conversely, targets with lower target data integrity (Row 3) undergo a New A.V.A. Target transition 222, represented by the "New A.V.A." arrow in FIG. 2, and are displayed in the "A.V.A. ADS Target" state 140, shown in the circle at the center of FIG. 2. The acronym A.V.A. (Aid to Visual Acquisition only) describes target position data 210 having a generally lower target data integrity.

Referring now to Row 4 of Table 2, the display does not change while the target data integrity and ownship data integrity remain the same. The transition referred to as Same Condition 230 on FIG. 2 is represented by a looping arrow that returns to the current target state, indicating no change in status or display.

Rows 5 and 6 of Table 2 show the transition events and display changes that occur when a pilot or other user selects or de-selects a target 200. In certain air traffic monitoring systems, the user may select or de-select a particular target 200 of interest on the display 32 using the control panel 34 (see FIG. 1) to learn more about the selected target position data 210. The Pilot Select transition 240 is depicted on FIG. 2 as arrows pointing downward and to the left. To indicate that the user has selected a target 200, the target icon changes. In one system, for example, the target icon color is changed to green and the target icon shape becomes filled when the target 200 has been selected by the user. While the target icon may change in response to being selected or de-selected, this change does not necessarily reflect a change in target data integrity. The characteristic or appearance of the icon communicating target data integrity does not change when the appearance changes to show selection or de-selection.

FIGS. 4a and 4b show the change in target icon that occurs in response to the Pilot Select transition 240 of Row 5, Table 2. A high-integrity target of interest is depicted using a solid chevron 20b in FIG. 4a. The same target is shown in FIG. 4b, at a later time, after being selected by the pilot or user and undergoing the Pilot Select transition 240, as an outlined chevron 24, communicating visually the fact that the target has been selected and that it remains a high-integrity target. It is important to understand that the chevron shape communicating the high target data integrity of the target was not altered by the pilot select event. Thus, it may be seen that the icon attributes of the present invention do not interfere with the attributes in use to communicate other status changes, such as pilot select and de-select.

The Pilot De-Select transition 242 is described in Row 6 and is depicted on FIG. 2 as arrows pointing upward and to the right. To indicate that the user has de-selected a target 200, the target icon changes. In one system, for example, the target icon color and shape are simply restored to their condition before being selected by the user.

Multiple Visual Cues from the Target Icon

It should be understood that the transition events listed in Table 2 and shown as arrows in FIG. 2 may occur in any order and at any time. Because of the number and variety of possible target states, as well as the transition events between and among the various target states, the target icon is tasked with communicating a wide assortment of target information to the user.

Among the target information being communicated by the target icon is the target data integrity, as determined by one aspect of the present invention. The target icon has a number of attributes susceptible to change, including shape, size, color, and other characteristics such as being outlined or filled, or flashing or still. In one aspect, the system of the present invention changes one or more attributes of the target icon in correlation with changes in target data integrity.

In an overall air traffic monitoring environment where standardized target icons may be already in use, it is an important aspect of the present invention that the inventive target icon attributes are designed to work in concert with existing target icon attributes. The target icon attributes to be altered by the present invention to reflect changes in data integrity will complement existing target icon attributes without interfering with the other target information or characteristics to be communicated.

It should also be understood that the target icons and the transition events to which they correspond are prioritized to ensure the accurate and timely display of the data most needed for safe flight. For example, a target icon might not be displayed due to filtering criteria such as altitude filtering, air versus ground filtering.

Conflict Detection Applications

Many air traffic monitoring systems include conflict detection tools such as a Conflict Situational Awareness (CSA) application and/or a Range Monitoring (RM) application. The starting and stopping of CSA and RM, in certain systems, may also result in a change of the target icon. Similarly, the identification of a potential conflict between aircraft may cause an alert condition and a further change of the target icon.

Rows 7 and 8 of Table 2 describe the logic and timing constraints associated with an alert predicted by the CSA application. The CSA Alert transition 250 is depicted in FIG. 2 by arrows pointing downward and to the right. In addition to and associated with the change in target icon by the present invention, a CSA Alert may be accompanied by an audible alert such as, "Traffic, Traffic" and a text message on the display 32.

In an illustration of the variety of possible target states, the CSA Alert can result in two different target states, depending upon whether the target has been selected by the user. The selected CSA target state 152 is represented by the circle at the bottom of FIG. 2. The de-selected CSA target state 154 is represented by the circle on the right side of FIG. 2.

The De-CSA transition 252 that takes place when the CSA alert has ended is described in Row 7 and is depicted on FIG. 2 as arrows pointing upward and to the left. Depending, again, upon whether the target has been selected by the user, the selected target returns to target state 150 as represented by the circle on the left side of FIG. 2. The de-selected target returns to normal target state 130 as represented by the circle at the top of FIG. 2.

Rows 9 and 10 of Table 2 describe the logic and timing constraints associated with an alert predicted by the Range Monitoring (RM) application, depicted in FIG. 2 as RI. An RI Alert may be accompanied by an audible alert such as, "Target Range" and a text message on the display 32. Range Monitoring can only be applied against a target 200 that has been selected by the user. Accordingly, the RI Alert transition 260 and the No-RI transition 262 events are represented by arrows located adjacent the selected target state 150 and the selected CSA target state 152 in FIG. 2.

The RI Alert transition 260 is depicted in FIG. 2 by a looping arrow adjacent the selected target states 150, 152 in FIG. 2. The arrow loops back to one of the selected target states 150, 152 because an RI Alert does not result in a change of target state, although it does result in an audible alert and an optional text message. While the CSA application predicts conflicts, the RM detects targets within a range limit. The No-RI transition 262 is depicted in FIG. 2 by the same looping arrow adjacent the selected target states 150, 152 in FIG. 2.

Improve/Degrade

In another aspect of the present invention, the target icon is changed when the target data integrity improves or degrades. Whenever the target data integrity degrades, the arrows in FIG. 2 representing this change of status point toward the center of the diagram.

Row 11 of Table 2 describes the process of changing the target icon in response to degraded target data integrity or degraded ownship data integrity. The Info Degrade transition 270 is depicted on FIG. 2 as arrows pointing toward the center A.V.A. ADS Target state 140. In one embodiment, the target icon is changed from a solid chevron to a solid bullet if data integrity degrades for at least five seconds.

FIGS. 4a and 4b illustrate the change in target icon that occurs in response to the Info Degrade transition 270 of Row 11, Table 2. A high-integrity target of interest is depicted using a solid chevron 20a in FIG. 4a. The same target is shown in FIG. 4b, at a later time, after undergoing the Info Degrade transition 240 due to a loss of integrity, as a solid bullet 22, communicating visually the fact that the target integrity has changed from high (chevron 20a) to low (bullet 22).

If and when data integrity improves, the target icon is changed as shown in Row 13 of Table 2. In one embodiment, the target icon is restored to its prior appearance. The Info Improve transition 272 is shown in FIG. 2 as the arrow pointing upward from the center state 140. In one embodiment, the logic and timing constraints in Row 13 will trigger the Info Improve transition 272 if target data integrity has not been in a degraded condition for at least three seconds, ownship data integrity has not been in a degraded condition for at least three seconds, and no alert condition has been detected or, if an alert condition exists, it has been detected for less than two seconds. In one embodiment, the target icon is changed from a solid bullet 22 as shown in FIG. 4b to a solid chevron 20a as shown in FIG. 4a if and when the conditions for an Info Improve transition 272 are met.

Row 12 of Table 2 describes the process of changing the target icon for a target 200 that has been selected by the user. Selection by the user typically indicates a particular interest in learning more detail about the target 200 selected. Accordingly, in addition to and associated with the change in target icon by the present invention, a degrade in the data integrity of a selected target may be accompanied by an audible alert such as, "Target Degrade" and a text message on the display 32 such as, "TGT Degrade." The Selected Info Degrade transition 280 is depicted on FIG. 2 as arrows pointing toward the center state 140 from the selected target states 150,152.

In yet another illustration of the variety of possible target states and transitions that may occur, an improvement in target data integrity may occur simultaneously with a CSA Alert. Row 14 of Table 2 describes this situation. In one aspect of the present invention, the target icon is changed to reflect both the integrity improvement and the existence of a CSA Alert. In one embodiment, the logic and timing constraints listed in Row 14 will trigger the Info Improve CSA Alert transition 274 if target data integrity has not been in a degraded condition for at least three seconds, ownship data integrity has not been in a degraded condition for at least three seconds, and a CSA Alert condition has been detected for at least two seconds. The Info Improve CSA Alert transition 274 is shown in FIG. 2 as the arrow pointing toward the right from the center state 140. In addition to and associated with the change in target icon by the present invention, the improved integrity and the CSA Alert may be accompanied by an audible alert such as, "Traffic, Traffic."

Finally, as described in Row 15 of Table 2, when a target 200 is lost, its status changes along the "Info Lost" transition arrow 290 into the double-circled "Drop" state 122 in the upper left quadrant of FIG. 2, which represents the final state for a target 200.

Adjustable Criteria

In another aspect of the present invention, the target data integrity affects whether one or more air traffic monitoring or conflict detection applications can be applied against a particular target 200. For example, if a target 200 has a low integrity, then the pilot or user may not select it and may not execute a Range Monitoring (RM) application against it. The bullet-shaped target icon tells the user the target 200 is not available.

In a related aspect of the present invention, the user may adjust the criteria used to determine the integrity of incoming target position data 210, including for criteria such as the time limit, for example, which is used to determine whether the target position data 210 is sufficiently recent to have high integrity. In one preferred embodiment, the user may use the control panel 34 on the CDTI 30 (see FIG. 1) to manually adjust and set the upper and lower limits applied to any element within the incoming target signal. The capacity to adjust the upper and lower limits of certain criteria permits the pilot or other user to tailor the target icons to fit the particular need, and also permits the use of traffic monitoring applications that have a variety of data integrity thresholds. Techniques for adjusting various limits on a CDTI 30 are well known to those skilled in the art. Importantly, being able to adjust the integrity criteria will allow the user to enable one or more range monitoring or conflict detection applications that require a specific level of integrity to function.

While this invention has been described in specific detail with reference to the disclosed embodiments, it will be understood that many variations and modifications may be effected without departing from the spirit and scope of the invention as described in the appended claims.

What is claimed is:

1. A method for displaying a target icon correlated to target data integrity, comprising:
   receiving target data describing a position of a target, said target data including a plurality of spatial coordinates defining said position, a time of measurement of said position, and an accuracy indicator;
   determining said target data integrity based upon said target data;
   assigning a target icon from a plurality of icons to represent said target, said target icon correlated to said target data integrity;
   displaying said target icon.

2. The method of claim 1, said target being characterized by said position and by a true location, wherein said accuracy indicator is based upon a probability that said true location is within a volume of space surrounding said position.

3. The method of claim 2, further comprising the step of adjusting said probability.

4. The method of claim 1, wherein said step of determining said target data integrity is based upon said target data and ownship data,
said ownship data including a plurality of spatial coordinates defining an ownship position, a time of measurement of said ownship position, and an ownship accuracy indicator.

5. The method of claim 1, wherein correlation of said target icon involves changing at least one attribute selected from the group consisting of shape, color, size, steady, flashing, surrounded by diagonal lines, solid, filled, outlined, annotated, and accompanied by an audible alert.

6. The method of claim 1, wherein said target icon is configured to communicate said target data integrity and a further characteristic of said target.

7. The method of claim 6, further comprising the step of assigning a differently appearing target icon in response to a change in status of said target, while continuing to communicate said further characteristic.

8. The method of claim 1, further comprising the step of storing said target data in a target file, said target file capable of storing said target data from a plurality of said targets, at a plurality of times, in a plurality of discrete records.

9. The method of claim 1, further comprising:
determining said target data integrity to be high at a first time if said accuracy indicator is more than an accuracy limit and the difference between said time of measurement and said first time is less than a time limit; and
otherwise, determining said target data integrity to be low at said first time.

10. The method of claim 9, wherein said target icon is a chevron shape while said target data integrity is high and said target icon is a bullet shape while said target data integrity is low.

11. The method of claim 9, further comprising the step of adjusting said accuracy limit.

12. The method of claim 9, further comprising the step of adjusting said time limit.

13. The method of claim 9, further comprising the steps of adjusting said accuracy limit and adjusting said time limit.

14. The method of claim 9, further comprising:
labeling said target data integrity as degraded if said target data integrity is low at a second time and the difference between said first time and said second time is less than a degrade time limit; and
assigning a second target icon from a plurality of icons to represent said target, said second target icon correlated to said degraded target data integrity.

15. The method of claim 14, further comprising:
labeling said target data integrity as improved if said target data integrity is high at a third time and the difference between said second time and said third time is less than an improve time limit; and
assigning a third target icon from a plurality of icons to represent said target, said third target icon correlated to said improved target data integrity.

16. An apparatus for displaying a target icon correlated to target data integrity, comprising:
a receiver for collecting target data describing a position of a target, said target data including a plurality of spatial coordinates defining said position, a time of measurement of said position, and an accuracy indicator;
a first processor in communication with said receiver, said first processor configured to determine said target data integrity based upon said target data;
a second processor in communication with said first processor, said second processor configured to assign a target icon from a plurality of icons to represent said target, said target icon correlated to said target data integrity; and
a display in communication with said second processor, said display configured to exhibit said target icon on a screen.

17. The apparatus of claim 16, wherein said first processor is further configured to determine said target data integrity based upon said target data and ownship data,
said ownship data including a plurality of spatial coordinates defining an ownship position, a time of measurement of said ownship position, and an ownship accuracy indicator.

18. The apparatus of claim 16, further comprising a target file configured to store said target data collected by said receiver from a plurality of said targets, at a plurality of times, in a plurality of discrete records,
said target file in communication with said receiver, said first processor, and said second processor.

19. A system for displaying a target icon correlated to target data integrity, comprising:
a receiving subsystem configured to collect target data describing a position of a target, said target data including a plurality of spatial coordinates defining said position, a time of measurement of said position, and an accuracy indicator;
a first processor in communication with said receiving subsystem, said first processor configured to direct the execution of a first application for determining said target data integrity based upon said target data;
a second processor in communication with said first processor, said second processor configured to direct the execution of a second application for assigning a target icon from a plurality of icons to represent said target, said target icon correlated to said target data integrity; and
a displaying subsystem in communication with said second processor, said displaying subsystem configured to visually exhibit said target icon on a screen.

20. The system of claim 19, wherein said first application is further configured to determine said target data integrity based upon said target data and ownship data,
said ownship data including a plurality of spatial coordinates defining an ownship position, a time of measurement of said ownship position, and an ownship accuracy indicator.

21. The system of claim 20, further comprising a target file configured to store said target data collected by said receiving subsystem from a plurality of said targets, at a plurality of times, in a plurality of discrete records,
said target file in communication with said receiving subsystem, said first processor, and said second processor.

* * * * *

UNITED STATES PATENT AND TRADEMARK OFFICE
CERTIFICATE OF CORRECTION

PATENT NO.     : 6,469,660 B1
DATED          : October 22, 2002
INVENTOR(S)    : Horvath et al.

It is certified that error appears in the above-identified patent and that said Letters Patent is hereby corrected as shown below:

<u>Title page,</u>
Item [56], References Cited, FOREIGN PATENT DOCUMENTS,
"0 441 309 A1" should read -- 0 411 309 A1 --.

<u>Drawings,</u>
Sheets 1-4 should be deleted to be substituted with the attached sheets 1-3, as shown on the attached pages.

Signed and Sealed this

First Day of April, 2003

JAMES E. ROGAN
*Director of the United States Patent and Trademark Office*

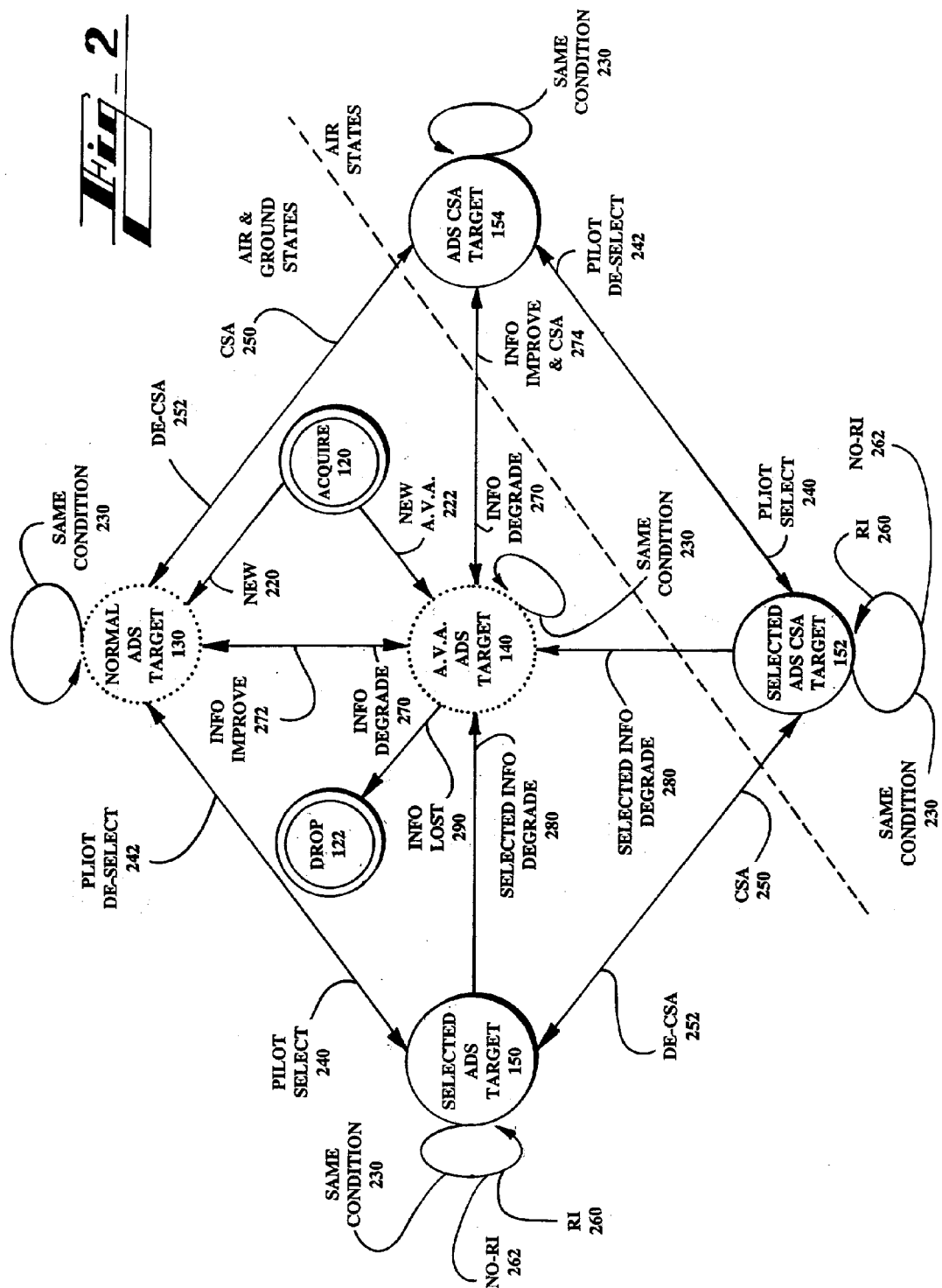

ADS-B AIRBORNE POSITION SIGNAL 83
| TYPE CODE 84 | ALTITUDE 86 | TIME OF APPLICABILITY 85 | LATITUDE 81 | LONGITUDE 82 |
⇩
NUCp
80
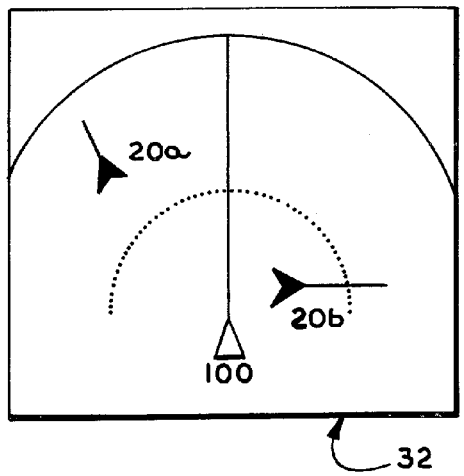
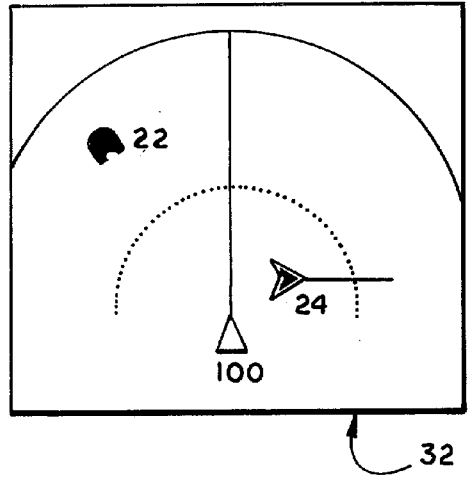
   

UNITED STATES PATENT AND TRADEMARK OFFICE
CERTIFICATE OF CORRECTION

PATENT NO.   : 6,469,660 B1
DATED        : October 22, 2002
INVENTOR(S)  : Horvath et al.

It is certified that error appears in the above-identified patent and that said Letters Patent is hereby corrected as shown below:

Title page,
Insert the following:
-- [73] Assignee: United Parcel Service of America, Inc., Atlanta, GA (US) --.

Signed and Sealed this

Tenth Day of June, 2003

JAMES E. ROGAN
*Director of the United States Patent and Trademark Office*